March 24, 1953   L. LEE, II   2,632,659

SWIVELING ELBOW FITTING

Filed Aug. 9, 1950

Inventor
LEIGHTON LEE II
By
Lindsey and Prutzman
Attorneys

Patented Mar. 24, 1953

2,632,659

UNITED STATES PATENT OFFICE 2,632,659

SWIVELING ELBOW FITTING

Leighton Lee II, Rocky Hill, Conn.

Application August 9, 1950, Serial No. 178,388

1 Claim. (Cl. 285—211)

The present invention relates to fittings for use in conduit systems employing thin wall tubing, and more particularly to an elbow fitting having particular utility for installation where space availability renders the installation of conventional elbow fittings difficult or impossible to accomplish.

It frequently is necessary to install an elbow connection between the ends of tubing or between tubing and a fixture where the space available is not much greater than that required to contain the fitting and connecting tubing. In such instances, when the space available is insufficient to permit the elbow to be turned about one of its axes or there is insufficient room to place a wrench or other turning tool radially of either of the nipples of the elbow, it is practically impossible to make the installation and much time and effort is consumed to overcome the difficulty presented, frequently without obtaining a good connection.

It is an aim of the present invention to provide an elbow fitting which will overcome the problem of installation where the elbow is to be installed in a place such that the space available for turning or working with the fitting is at a minimum and the procedure normally followed for connecting the fitting cannot be carried out conveniently.

A further object of the invention is to make an elbow fitting for installation in places of small space availability which despite its adaptability and advantages from an installation standpoint will produce a satisfactory connection comparable to that of conventional fittings and may be subjected to the usual pressures or distortions normally encountered without leakage or other failure of the fitting.

Another object of the invention is to provide such an elbow fitting which is of economical and simple design so that it may be fabricated and assembled at a minimum of expense and effort and therefore may be substituted for conventional fittings at little increase in cost.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claim.

Figure 1:
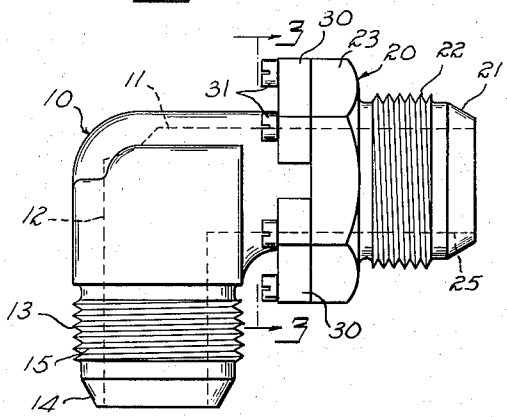
Figure 1 is a side view of an elbow fitting embodying the present invention.

Referring to the drawing, there is shown in Fig. 1 an elbow 10 containing a bore 11 extending at right angles to a second bore 12. As used herein the term "elbow" is meant to include any of the conventional types of elbows employed in tubing installations for change of direction, including not only the compact right angle elbow as shown in the drawings but also the well-known arcuate tube type of elbow.

One end of the elbow 10 containing the bore 12 is formed with a threaded nipple 13 integral therewith and by means of which the end of a connecting tubing may be attached thereto. The tubing is not shown in the drawings and normally the same would be formed with a beveled seat to abut against the conical section 14 and would be clamped to the nipple by means of a suitable clamping collar or socket part received on the threaded portion 15.

The opposite end of the elbow 10 containing the bore 11 is formed in accordance with the invention with a nipple 20 which is swivelly connected in fluid-proof fashion to the elbow 10 so that the nipple may be turned relative to the elbow. The nipple 20 is formed in similar manner to the nipple 13 in that it has a conical section 21 and threaded portion 22 whereby tubing may be clamped thereto or the same may be inserted into a fixture.

Figure 2:
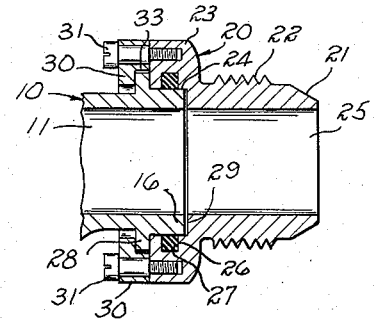
Fig. 2 is a fragmentary cross sectional view of the swivelly connected nipple portion of the fitting.
Figure 3:
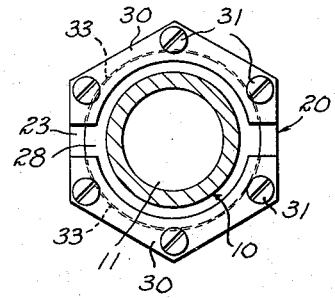
Fig. 3 is a cross sectional view taken along the line 3—3 of Fig. 1.

As best shown in Fig. 2 of the drawings, the nipple 20 is formed with an enlarged end portion 23 having a counterbore 24 therein for the reception of the adjacent end portion 16 of the elbow 10. A through bore 25 corresponding to bore 11 is provided in the nipple, the counterbore 24 and through bore 25 at their juncture forming a shoulder 29.

An annular groove 26 is provided in the enlarged portion 23 about the counterbore 24 for receiving an O ring 27 of suitable resilient packing material whereby a fluid-proof joint between the nipple and the end portion 16 of the elbow is assured.

In accordance with the invention, the end portion 16 of the elbow is provided with an annular ridge 28 against which the enlarged portion 23 of the nipple 20 can abut, annular ridge 28 being so located that the end of the nipple will be positioned just short of the shoulder 29 and thus not rub thereagainst. In order to retain the nipple in abutting relationship with the ridge 28 while at the same time permitting the nipple to rotate relative to the elbow, there is provided a pair of locking plates 30 which are bolted to the enlarged portion 23 by means of a plurality of bolts 31. The locking plates 30 are provided with a groove 33 for reception of the annular ridge 28, the locking plates 30 and the grooves 33 being dimensioned so that the inner edge of the plate 30 will clear the elbow, while the groove 33 will clear the outer edge of the ridge 28 and will engage only on the adjacent side surface of the ridge 28. In this way the nipple 20 is kept in close abutting relationship with the ridge 28 but at the same time all unnecessary friction is avoided. It has been found that with such a construction the nipple 20 will be adequately secured to the elbow 10 and yet may be easily turned relative to the elbow 10.

To facilitate turning of the nipple 20, the outer surface of the enlarged portion 23 may be made polygonal in outline, as are the locking plates 30 bolted thereto.

With an elbow constructed in accordance with the invention as above described, it is possible to attach the nipple portion 20 of the elbow to a fixture or to the end of a tubing merely by turning the enlarged portion 23 with a wrench or other suitable turning tool, it being unnecessary to rotate the elbow 10 about the axis of the end portion 16. Accordingly, the only installation space required is that sufficient to receive the enlarged portion 23. In the event that there is insufficient room for attaching the nipple 13 at the other end of the elbow to a connecting tube when the elbow is installed, it is possible to attach the tubing to the nipple 13 before the elbow is installed. By following this procedure, no clearance is required for a tool extending radially of the fixed nipple 13 of the elbow and the elbow may be secured in place merely by turning the enlarged portion 23 and hence the nipple 20 by the use of a tool extending in a plane generally parallel to the axis of the bore 12 of the elbow 10.

The elbow of the present invention, despite its adaptability, provides a satisfactory fluid-proof connection equivalent to that of conventional elbows, and is simple and easily to fabricate and assemble so that the cost of the improved elbow is kept to a minimum. There is thus provided an efficient and economical elbow arrangement for use in restricted spaces where ordinary elbows cannot be installed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

I claim as my invention:

A fitting comprising an elbow member having end portions at right angles to each other and having a through bore therein, one of said end portions being threaded and the other end portion having an integral circumferential flange spaced from the extremity thereof, a straight detachable nipple member having a through bore, a threaded end and an enlarged end having a counterbore of sufficient size to receive telescopically said other end portion of the elbow member, the bottom of said counterbore forming a shoulder with the nipple through bore, said enlarged end having an annular portion thereof in sealing engagement with one side of said flange, said one side of said flange being spaced closer to the extremity of said other end than the confronting face of said annular portion is spaced from said shoulder thereby to produce a spaced relation between the extremity of the said other end portion and said shoulder, said detachable member being provided with an annular groove located in an axial direction intermediate the length of said counterbore, an O ring of resilient material disposed in said groove, a plurality of laterally removable locking plates for engaging the other side of said flange and of sufficient size to overlie said enlarged end, said plates being provided with a plurality of apertures spaced outwardly relative to the flange engaging portions of said plate, and a plurality of bolts extending axially through said apertures into engagement with said enlarged end of said nipple member to provide said engagement between said annular portion and said flange.

LEIGHTON LEE II.

REFERENCES CITED

The following references are of record in the file of this patent:

UNITED STATES PATENTS

| Number | Name | Date |
|--------|------|------|
| 545,268 | Campbell | Aug. 27, 1895 |
| 676,846 | Moran | June 18, 1901 |
| 1,605,507 | Burke | Nov. 2, 1926 |
| 1,884,266 | Russell | Oct. 25, 1932 |
| 2,020,365 | Lofton | Nov. 12, 1935 |
| 2,453,597 | Sarver | Nov. 9, 1948 |

FOREIGN PATENTS

| Number | Country | Date |
|--------|---------|------|
| 303,540 | Great Britain | Dec. 31, 1928 |
| 366,223 | Great Britain | Feb. 4, 1932 |